UNITED STATES PATENT OFFICE 2,321,208

ORGANIC SOLUTION OF FORMALDEHYDE-UREA REACTION PRODUCT

Arthur M. Howald, Toledo, Ohio, assignor, by mesne assignments, to Libbey-Owens-Ford Glass Company, a corporation of Ohio No Drawing. Application April 24, 1941, Serial No. 390,101

11 Claims. (Cl. 260—29)

Solutions of formaldehyde-urea reaction products are valuable as binders in the adhesive and impregnating arts, because the dissolved formaldehyde-urea compound is thermosetting and can therefore be rendered insoluble after the solution has been applied, to produce a water resistant bond. The solutions that have been employed heretofore as binders have been aqueous solutions. Before an aqueous solution of a formaldehyde-urea reaction product can be employed as a binder, it must be acidified. However, the acidifying agent cannot be added until just before the binder is to be applied, because the formeladehyde-urea compounds in the acidified aqueous solutions are unstable and gradually become converted into the insoluble resin. Thus aqueous solutions require special handling in that they must be acidified just before being used as binders.

An acid can be incorporated in organic solutions of formaldehyde-urea reaction products without rendering them unstable, so that organic solutions can be shipped with the proper amount of acid already incorporated, and the user is not required to acidify the solutions before applying them. Moreover, organic solutions are superior to aqueous solutions as binders in that organic solvents can be employed that evaporate much faster than water. In fact aqueous solutions evaporate so slowly that the formaldehyde-urea compound tends to become converted to its insoluble and infusible state before the water has been evaporated. Thus an advantage of an organic solution is that it can be evaporated before the formaldehyde-urea compound has become infusible, so that the compound can then be caused to fuse and flow to form a better bond when the article is given its final form by hot-pressing.

Heretofore organic solutions have been quite expensive to prepare compared with aqueous solutions. It has been necessary to employ a large excess of organic solvent in order to dissolve a formaldehyde-urea reaction product, and a considerable proportion of the solvent had to be evaporated to produce a solution sufficiently concentrated to be suitable for shipment. Since organic solvents are expensive, it was always necessary to go to considerable trouble to recover the solvent.

Organic solutions of formaldehyde-urea reaction products are known to have very interesting possibilities for use in lacquers. Formaldehyde-urea lacquers form coatings that are unexcelled in their infusibility, insolubility and light resistance. These coatings are superior to those made from phenolic resins, because the latter resins are inherently dark colored and lack resistance to light, whereas formaldehyde-urea resins can be used to produce perfectly transparent, pure white or delicately tinted coatings that are entirely unaffected by light. However, formaldehyde-urea coatings have not gone into extensive commercial use, because coatings heretofore produced have in practice had to be baked at a controlled temperature for a controlled length of time in order to give them the necessary properties. The lacquers that are now in extensive commercial use are "air-drying" rather than "baking" lacquers, and a formaldehyde-urea lacquer that is air-drying in the commercial sense of the term has never before been produced.

The principal object of the invention is the preparation of organic solutions of formaldehyde-urea reaction products that can be employed as inexpensive binders and air-drying lacquers. More specific objects and advantages are apparent from the description, which merely discloses and illustrates the invention and is not intended to impose limitations upon the claims.

An air-drying lacquer solution embodying the invention comprises an organic solvent, an acid and a formaldehyde-urea reaction product that has been condensed out of organic solution. The preferred solutions for various uses are prepared in accordance with the invention from a formaldehyde-urea reaction product that has been condensed in an aqueous solution. After being condensed in an aqueous solution and before being dissolved in an organic solvent, the formaldehyde-urea reaction product may be dehydrated by heat. When a reaction product has been condensed in an aqueous solution, the evaporation of the water is preferably commenced while the formaldehyde-urea reaction product is still water-soluble.

Preparation of binder

A binder embodying the invention comprises a substantially stable acid organic solution prepared from an alcohol and a water-soluble formaldehyde-urea reaction product that has been condensed in an aqueous solution.

The first step in the preparation of the binder is to heat an aqueous solution of a formaldehyde-urea compound until the desired degree of condensation has been attained. Preferably, the condensation in the aqueous solution is not carried so far as to precipitate the formaldehyde-urea compound, so that evaporation of water can be commenced while the compound is still water-soluble.

The preferred procedure is to spray-dry the final aqueous solution, and the spray-dried material may be dissolved in an organic solvent comprising an alcohol in the presence of an acid. It has been discovered that methanol is an excellent solvent for the spray-dried material if the methanol is strongly acid (pH preferably below 3). It is possible to dissolve 60 parts of the spray-dried product in 40 parts of the methanol, the resulting solution being sufficiently concentrated to be shipped economically.

The organic solutions of formaldehyde-urea reaction products heretofore prepared have been so dilute that it has been necessary to remove a large proportion of the solvent by evaporation in a solvent recovery apparatus. An important advantage of the organic solution prepared in accordance with the invention by dissolving the spray-dried product is that it contains only a limited amount of water. In the preparation of prior organic solutions from uncondensed reaction products it has been necessary to eliminate the water of condensation contained in the products. Such products have therefore been dissolved in alcohols having boiling points higher than that of water to permit the driving off of the water of condensation by evaporation of the alcoholic solvent.

Arresting the condensation in aqueous solution in accordance with the invention, before the reaction product precipitates from the solution, has two advantages: It permits the solid product to be obtained by spray-drying much more cheaply than a precipitated product could be separated by filtration or the like; also, the dried water-soluble product can be dissolved in a relatively small proportion of organic solvent to form a stable solution.

It should be noted that the acid organic solution must be sufficiently anhydrous to be stable. If the organic solution is not sufficiently anhydrous, the acid cannot be incorporated until just before the solution is applied, as in the case of a water solution.

Organic solutions of formaldehyde-urea compounds are useful as binders in many applications for which aqueous solutions are unsuited. For example, organic solutions penetrate certain fabrics, such as wool, better than aqueous solutions. Impregnation of fabrics with formaldehyde-urea solutions followed by the conversion of the formaldehyde-urea compound to the insoluble state imparts stiffness or water-resistance to the fabrics. Films produced by the organic solutions are transparent, whereas films produced from aqueous solutions are not. Thus an organic solution can be used as an adhesive for laminated glass.

The advantages of a binder embodying the invention may be summarized as follows:

(1) Since the condensation in aqueous solution is arrested before the reaction product precipitates, the product can be economically separated.

(2) The resulting water-soluble product can be dissolved in a small quantity of organic solvent to form a stable solution.

(3) Since the resulting solution is sufficiently anhydrous to be stable, the solvent does not have to be evaporated to expel water, and can be methanol, which is much cheaper than the higher boiling solvents that are capable of driving off water by evaporation.

(4) The methanol, in addition to being cheap, is such a good solvent that the reaction product can be dissolved to form a solution so concentrated that no evaporation is necessary. As a result, the binder can be made cheaply in contrast to prior organic solutions, which were too expensive for wide use as binders.

(5) The resulting binder is superior to a water solution in that it does not need to be acidified before use, is capable of penetrating materials that are not penetrated by an aqueous solution, and evaporates faster than an aqueous solution, so that an impregnated product can be dried and formed in a press before the formaldehyde-urea compound becomes infusible.

A binder may be prepared as follows: Urea and formaldehyde in a molar ratio of 1 to 2 are gently refluxed in an aqueous solution that has been brought to pH 4.5–5.0 by means of sodium hydroxide. After the refluxing has been continued long enough (about 1 hour) to carry the formaldehyde-urea reaction to the desired stage, the solution is neutralized and evaporated (preferably under a vacuum) to the desired concentration. The solution is then spray-dried, and the spray-dried product (60 parts) is dissolved in methanol (40 parts) that has been acidified with maleic acid. About 1 part of maleic acid is required to cause the dried product to dissolve, and the acidified methanol is heated to about 60° C. before addition of the product is commenced. Unless the methanol is stirred rapidly and thoroughly, the dissolving takes place very slowly. The spray-dried product should be added slowly at first, and the addition should again be slow after most of the product has been dissolved. The resulting stable solution contains up to about one eighth of its weight of water, formed by reaction of methanol with the dried product.

If desired, the methanol may be replaced by another alcohol, such as glycol monomethyl ether, pentanol, and other lower alcohols. However, if an alcohol other than methanol is used, the acid solution must be substantially anhydrous in order to be stable. It is only because of the ability of a methanol solution to tolerate an unusually high water content without becoming unstable that the methanol solution prepared in accordance with the procedure of the foregoing paragraph remains stable while containing up to one eighth of its weight of water.

An acid other than maleic may be used, but organic acids such as maleic, phthalic and benzoic are preferred. The common inorganic acids are so strong that it is difficult to incorporate them in a proper amount. If desired, a portion of the acid may consist of iso dibrom succinic acid, which is a substance of the type that liberates a strong acid upon being heated. The iso dibrom succinic acid is believed to act as a latent accelerator by liberating a strong acid when an article made from the binder is hot-pressed. Thus it is thought to accelerate the conversion of the binder to the insoluble state during hot-pressing without tending to render the binder solution unstable. Ordinarily, the alcoholic solvent need only be acid enough to cause the formaldehyde-urea compound to dissolve. A binder solution prepared by the procedure described above may be regarded as stable because it shows very little increase in viscosity over a period of several months.

Preparation of air-drying lacquer

Various properties of an organic solution containing a formaldehyde-urea reaction product that has been condensed out of organic solution, as compared with other organic solutions, indicate that the condensation reaction can be advanced much farther if it is carried out before the organic solution is prepared.

An air-drying lacquer embodying the invention is prepared by condensing a reaction product and then dissolving it in an organic solvent, so that the dissolved product is advanced much farther toward the insoluble or resinous state than a product that has been dissolved in an organic solvent and then condensed.

An air-drying lacquer embodying the invention is acid, so that the conversion of the formaldehyde-urea reaction product to the resinous state, which has already been carried to an advanced stage, proceeds rapidly after the lacquer is applied in the form of a coating. Within 1 to 3 days after an air-drying lacquer embodying the invention is applied the coating is practically insoluble in all solvents. Yet the lacquer containing an adequate amount of acid is perfectly stable.

The term "air drying" is used herein to denote a lacquer that forms a coating which is practically insoluble in water and all other solvents, and therefore resistant to the action of all solvents within 1 to 3 days after being applied. The term is used to denote a lacquer that forms coatings which are not merely incapable of being washed away by a solvent but are actually resistant to the action of water and other solvents after 1 to 3 days. Thus an article coated with a lacquer embodying the invention can be handled by moist hands or left outdoors in the rain after 1 to 3 days from the application of the coating. A lacquer embodying the invention can be used for finishing automobiles and other products that require resistant finishes.

The present lacquer is believed to be the first formaldehyde-urea lacquer capable of being applied commercially without baking. Obviously, a lacquer is not commercially air-drying if an article coated therewith cannot be handled or allowed to get wet for several weeks after the application of the coating without marring the finish.

Nitro-cellulose can advantageously be incorporated with the present lacquers, and the resulting solution air-dries faster than the lacquer containing the formaldehyde-urea compound alone. Coatings made from lacquers embodying the invention are superior to nitro-cellulose coatings and the various air-dried finishes in present use, such as the finish used on automobiles, in that the present lacquer gives coatings of superior durability which cannot be dissolved in organic solvents like coatings made from present air-drying lacquers.

An air-drying lacquer embodying the invention may be prepared as follows: The final aqueous solution obtained in the same manner as in the preparation of the binder is spray-dried, and the dried product is held for several hours at 100° C. The resulting product may be insoluble in water. This product (100 parts) is then dissolved in methanol (200 parts) containing sufficient maleic acid to cause the solid to dissolve (about 2 parts). The dissolving is carried out at 60°–65° C. with rapid agitation. When the dissolving has been practically completed, n-butanol (150 parts) is added, and the liquid is clarified by filtration. Then the solution is evaporated as rapidly as possible under a vacuum of about 27 inches to a concentration of about 65% solids. During the evaporation the temperature rises gradually from 25° C. to a maximum of 60°–80° C. Finally, toluene, petroleum naphtha, or coal tar naphtha is added as a thinner to reduce the concentration of the solution to about 45% solids.

When the resulting lacquer solution is applied, it forms a hard, glossy film that is perfectly colorless and transparent unless pigment is used. The toughness of the film is improved by incorporating a suitable plasticizer with the lacquer. If the 45% lacquer solution is mixed with a 45% nitro-cellulose solution, a lacquer is produced which has a viscosity not appreciably greater than that of the 45% formaldehyde-urea lacquer solution. The properties of a coating made from the mixed solution are superior in many ways to the properties of a coating made from either solution alone.

If in the preparation of a lacquer by the procedure described above the period for which the spray-dried product is held at 100° C. is 3 hours, dust will not adhere to a coating made by applying the resulting lacquer 1½ hours after the lacquer has been applied. After 20 hours the coating does not feel tacky. When the procedure is the same except that the dried product is held at 100° C. for 5 hours, dust will not adhere ¾ of an hour after the coating has been applied, and the coating does not feel tacky after 4 hours. These coatings are resistant to water, methanol, acetone and glycol monomethyl ether within 48 hours after they have been applied.

Instead of being held at 100° C. after the spray-drying, the product may be dehydrated by suitable application of heat in the spray-drying process.

Acids other than maleic can be employed, but organic acids are preferred.

In the procedure hereinbefore described, the evaporation of the alcoholic solution to 65% solids drives off the methanol so that only n-butanol remains. However, methanol is desirable for the initial dissolving of the dried product, because methanol is a better solvent for the product than n-butanol. If n-butanol without any methanol were employed for dissolving the product, a larger quantity of solvent would be necessary, and the large excess of solvent would have to be evaporated to produce a solution of the desired concentration.

Methanol is not used alone because it is too volatile for incorporation in a commercial lacquer. Moreover, n-butanol has a higher boiling point than water, so that the last traces of water are driven off during the final concentration of the n-butanol solution. If the last traces of water were not driven off, the resulting lacquer would not be fully compatible with hydrocarbons such as toluene. In place of n-butanol, other alcohols such as glycol monomethyl ether, pentanols, and other lower alcohols may be employed.

Although the formaldehyde-urea reaction product added to the organic solvent is preferably obtained by spray-drying an aqueous solution, the solid product may also be obtained by evaporating an aqueous solution on an atmospheric or vacuum drum drier.

Manufacture of cast articles

The present solutions can be cast to form transparent articles. Although evaporation of the solvent may occur after an article has been cast from the present solutions, the casting remains transparent. Aqueous solutions cannot be used for casting, because evaporation of the water from an aqueous solution, unlike evaporation of the solvent from an organic solution, causes the casting to become opaque.

Solutions embodying the invention are superior to prior casting solutions in that they can be cast at ordinary temperatures, no baking being required. Casting solutions embodying the invention also have a very important property that has heretofore been generally lacking in formaldehyde-urea casting solutions, i. e., fluidity or low viscosity. Unless the viscosity of a casting liquid is very low, air bubbles are invariably trapped in the liquid when it is poured into a mold, and the high viscosity of the liquid prevents the bubbles from rising to the surface before the casting is hardened. A casting liquid may be prepared in accordance with any of the foregoing procedures, and the proportion of solvent may be varied as desired to obtain the proper viscosity.

One use of these casting liquids is for preserving scientific specimens. Any of the organic solutions that have been described may be poured into a bottle and acidified with 5% of its weight of iso dibrom succinic acid. The specimen is then placed in the bottle and the bottle is sealed in order to arrest completely the evaporation of the solvent. The 5% of acid causes the liquid to become transformed into a glass-like solid, which both preserves and supports the specimen.

Various embodiments of the invention may be devised to meet various requirements.

This application is a continuation-in-part of application Ser. No. 213,654, filed by the present applicant on June 14, 1938.

Having described my invention, I claim:

1. A substantially anhydrous organic solution prepared from an acid, an organic solvent comprising an alcohol, and a water-soluble formaldehyde-urea reaction product that has been condensed to a point beyond the addition stage in an aqueous solution substantially free of organic solvents for said reaction product.

2. A substantially stable acid solution containing not more than about one part by weight of water for every eight parts of the solution, prepared from methanol, an acid, and a water-soluble formaldehyde-urea reaction product that has been condensed to a point beyond the addition stage in an aqueous solution substantially free of organic solvents for said reaction product.

3. A substantially anhydrous and stable air-drying lacquer solution prepared from an organic solvent comprising an alcohol, an acid, and a formaldehyde-urea reaction product that has been condensed in an aqueous solution substantially free of organic solvents for said reaction product to a point, beyond the addition stage, at which the condensation product is still water-soluble.

4. A substantially anhydrous and stable air-drying lacquer solution prepared from an organic solvent comprising an alcohol, an acid, and a formaldehyde-urea reaction product that has been condensed to a point, beyond the addition stage, at which the condensation product is still water-soluble, in an aqueous solution substantially free of organic solvents for said reaction product, and then dehydrated by heat.

5. A substantially anhydrous organic solution prepared from an acid, an organic solvent comprising an alcohol, and a formaldehyde-urea reaction product that has been condensed to a point, beyond the addition stage, at which the condensation product is still water-soluble, in an aqueous solution substantially free of organic solvents for said reaction product, and then dehydrated by heat.

6. A substantially anhydrous and stable acid organic solution prepared from an acid, an organic solvent comprising an alcohol and a formaldehyde-urea reaction product that has been condensed to a point, beyond the addition stage, at which the condensation product is still water-soluble, in an aqueous solution substantially free of organic solvents for said reaction product, and then dehydrated by heat.

7. A method of preparing a substantially anhydrous organic solution that includes condensing a formaldehyde-urea reaction product to a point beyond the addition stage in an aqueous solution substantially free of organic solvents for said reaction product, commencing evaporation of the water while the product is still water-soluble, evaporating to a solid product, and dissolving the solid product in an organic solvent comprising an alcohol in the presence of an acid.

8. A method of preparing a substantially anhydrous organic solution that comprises condensing a formaldehyde-urea reaction product in an aqueous solution substantially free of organic solvents for said reaction product to a point, beyond the addition stage, at which the condensation product is still water-soluble, spray-drying said solution, and dissolving the spray-dried material in an organic solvent comprising an alcohol in the presence of an acid.

9. A method of preparing a substantially anhydrous organic solution that comprises condensing a formaldehyde-urea reaction product in an aqueous solution substantially free of organic solvents for said reaction product to a point, beyond the addition stage, at which the condensation product is still water-soluble, then dehydrating the condensed product by heat, and dissolving it in an organic solvent comprising an alcohol in the presence of an acid.

10. A substantially anhydrous and stable air-drying lacquer solution prepared from an organic solvent comprising an alcohol, an acid, nitrocellulose, and a formaldehyde-urea reaction product that has been condensed in an aqueous solution substantially free of organic solvents for said reaction product to a point, beyond the addition stage, at which the condensation product is still water-soluble.

11. A method of preparing a substantially stable methanol solution containing not more than about one part by weight of water for every eight parts of the solution; that includes condensing a formaldehyde-urea reaction product to a point beyond the addition stage in an aqueous solution substantially free of organic solvents for said reaction product, commencing evaporation of the water while the product is still water-soluble, evaporating to a solid product, and dissolving the solid product in methanol in the presence of an acid.

ARTHUR M. HOWALD.